(12) United States Patent
Sugaya (10) Patent No.: US 10,529,102 B2
(45) Date of Patent: Jan. 7, 2020

(54) IMAGE PROCESSING SYSTEM, IMAGE PROCESSING APPARATUS, IMAGE PROCESSING METHOD, AND PROGRAM

(71) Applicant: OPTiM Corporation, Saga (JP)

(72) Inventor: Shunji Sugaya, Tokyo (JP)

(73) Assignee: OPTiM Corporation, Saga-shi (JP)

( * ) Notice: Subject to any disclaimer, the term of this patent is extended or adjusted under 35 U.S.C. 154(b) by 0 days.

(21) Appl. No.: 15/326,177

(22) PCT Filed: Sep. 9, 2016

(86) PCT No.: PCT/JP2016/076572
§ 371 (c)(1),
(2) Date: Jan. 13, 2017

(87) PCT Pub. No.: WO2018/047287
PCT Pub. Date: Mar. 15, 2018

(65) Prior Publication Data
US 2019/0347840 A1 Nov. 14, 2019

(51) Int. Cl.
*G09G 5/00* (2006.01)
*G06T 11/60* (2006.01)
*G06F 3/14* (2006.01)
*G06F 3/0484* (2013.01)
*G06T 11/00* (2006.01)
*G06F 3/0488* (2013.01)

(52) U.S. Cl.
CPC .......... *G06T 11/60* (2013.01); *G06F 3/04845* (2013.01); *G06F 3/04883* (2013.01); *G06F 3/1454* (2013.01); *G06T 11/001* (2013.01); *G06T 2200/24* (2013.01)

(58) Field of Classification Search
CPC ......... G06T 11/60; G06T 19/00; G06T 11/00; G06F 9/4443; G06F 3/0481
USPC ........................................................ 345/619
See application file for complete search history.

(56) References Cited

U.S. PATENT DOCUMENTS

| 2012/0044335 | A1* | 2/2012 | Goto ..................... | A45D 44/005 348/77 |
| 2015/0248581 | A1* | 9/2015 | Gouda ............... | G06K 9/00281 345/633 |

FOREIGN PATENT DOCUMENTS

| JP | 08-202893 | 8/1996 |
| JP | 2005-092588 | 4/2005 |
| JP | 2007-257655 | 10/2007 |

* cited by examiner

*Primary Examiner* — Gordon G Liu
(74) *Attorney, Agent, or Firm* — LEX IP MEISTER, PLLC (57) ABSTRACT

An acquiring unit acquires a face image. A display control unit displays the face image acquired by the acquisition unit on a display unit. A detection unit detects positions on the face image designated by a pointer 20. A drawing unit draws makeup objects 34 and 35 on the face image along the trajectory specified by sequentially connecting the positions detected by the detection unit. The overlap control unit increases a density of an overlapping portion 36 between the makeup object 34 and the makeup object 35. The correction unit corrects the density of the overlapping portion 36 at a position corresponding to a point P3 when the trajectory has the point P3 where a direction changes with a change amount equal to or greater than a threshold value.

10 Claims, 7 Drawing Sheets

IMAGE PROCESSING SYSTEM, IMAGE PROCESSING APPARATUS, IMAGE PROCESSING METHOD, AND PROGRAM

TECHNICAL FIELD

The present invention relates to an image processing system, an image processing apparatus, an image processing method, and a program.

BACKGROUND ART

Techniques for makeup simulation have been known. For example, Patent Document 1 describes a technique of applying makeup to an image of a subject in response to an operation of a stylus pen.

PRIOR ART DOCUMENT

Patent Document

Patent Document 1: Japanese Patent Application Publication No. 2005-92588

SUMMARY OF THE INVENTION

Technical Problem

As in the technique described in Patent Document 1, in a case where makeup is performed along a trajectory of a pointer such as a stylus pen, if a moving direction of the pointer greatly changes in the middle of movement, the trajectory of a position of the pointer is erroneously specified. As a result, a color of the makeup may be painted over a portion where the moving direction changes in the trajectory. In this case, since a density of this portion increases against an intention of a user, it is impossible to simulate the intended makeup.

The present invention aims to simulate the makeup according to the user's intention.

Technical Solution

According to the present invention, there is provided an information processing apparatus including an acquiring unit for acquiring a face image, a display control unit for displaying the acquired face image on a display unit, a detecting unit for detecting positions on the face image designated by a pointer, a drawing unit for drawing a makeup object on the face image along a trajectory specified by sequentially connecting the detected positions, an overlap control unit for increasing a density of one or more overlapping portions between the makeup object and another makeup object, and a correction unit for correcting, when the trajectory has a point where a direction changes with a change amount equal to or greater than a threshold value, a density of a first overlapping portion at a position corresponding to the point which is included in the one or more overlapping portions.

Effects of the Invention

According to the present invention, it is possible to simulate the makeup according to the user's intention.

DESCRIPTION OF REFERENCE NUMBERS

1: image processing system, 10: user terminal, 20: pointer, 30: terminal, 11: processor, 12: memory, 13: communication interface, 14: touch sensor, 15: operation button, 16: display, 17: camera, 18: storage device, 101: acquisition unit, 102: display control unit, 103: specifying unit, 104: drawing unit, 105: overlap control unit, 106: correction unit, 107: transmission unit, 108: second display control unit, 109: correction control unit, 112: first display control unit

DETAILED DESCRIPTION OF THE EMBODIMENTS

Configuration

Figure 1:
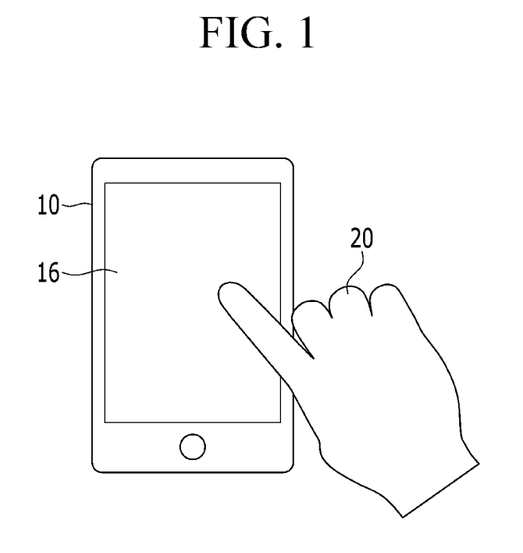
FIG. 1 is a diagram showing an example of an appearance of a user terminal 10.

FIG. 1 is a diagram showing an example of an appearance of a user terminal 10 according to a present embodiment. The user terminal 10 is a computer such as a tablet terminal, a mobile terminal, a personal computer, or the like. The user terminal 10 is used by the user. The user terminal 10 includes a touch panel and receives an operation using a pointer 20 such as a user's finger or a stylus pen. The user terminal 10 performs a makeup simulation using a face image of the user in accordance with the operation using the pointer 20.

Figure 2:
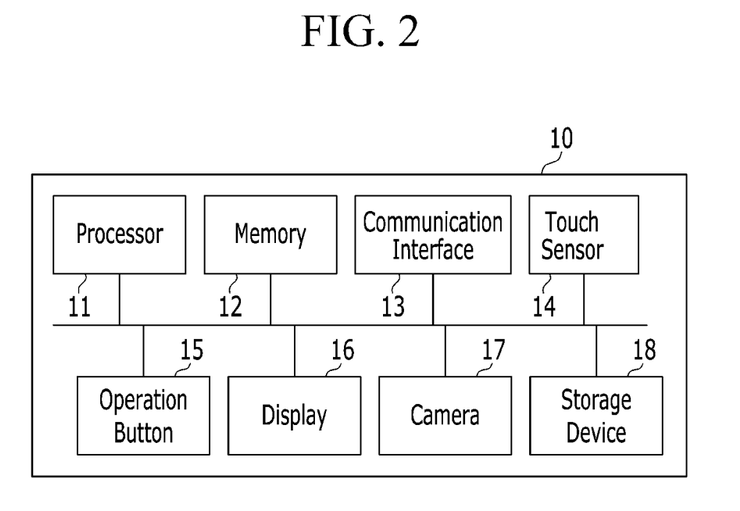
FIG. 2 is a diagram showing an example of a hardware configuration of a user terminal 10.

FIG. 2 is a diagram showing an example of a hardware configuration of a user terminal 10. The user terminal 10 includes a processor 11, a memory 12, a communication interface 13, a touch sensor 14, an operation button 15, a display 16, a camera 17, and a storage device 18.

The processor 11 executes various processes according to a program stored in the memory 12. For example, a central processing unit (CPU) is used as the processor 11. The memory 12 stores a program to be executed by the processor 11. For example, a random access memory (RAM) is used as the memory 12. The communication interface 13 is connected to a network and performs communication via the network.

The touch sensor 14 (an example of a detection unit) is installed to be overlapped with the display 16. The touch sensor 14 detects a position of the pointer 20 touching the display 16. This detection method of the position may be a resistance film method, a capacitance method, or another method. The touch sensor 14 and the display 16 form the touch panel.

The operation button 15 is used for an operation of the user terminal 10. The display 16 (an example of a display unit) displays various kinds of information. For example, a liquid crystal display is used as the display 16.

The camera 17 takes an image. For example, a digital still camera is used as the camera 17. The storage device 18 stores various programs and data. For example, a flash memory or a hard disk drive is used as the storage device 18.

Figure 3:
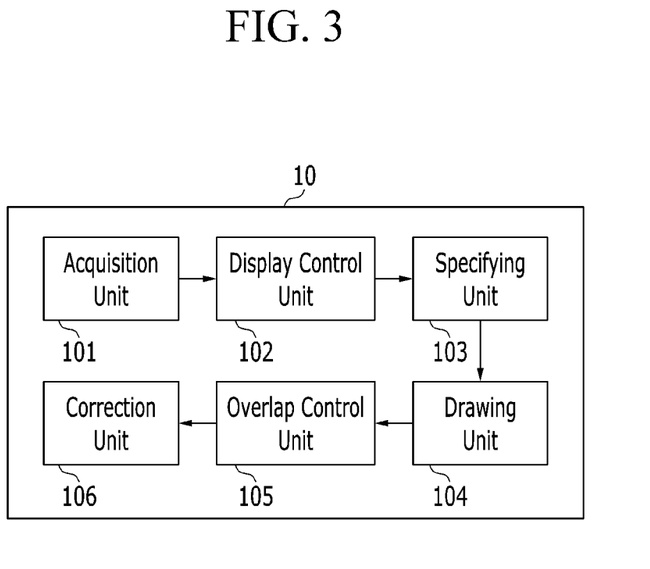
FIG. 3 is a diagram showing an example of a functional configuration of a user terminal 10.

FIG. 3 is a diagram showing an example of a functional configuration of a user terminal 10. The user terminal 10 functions as an acquisition unit 101, a display control unit 102, a specifying unit 103, a drawing unit 104, an overlap control unit 105, and a correction unit 106. These functions are realized by executing a program stored in the memory 12 by one or more processors 11.

The acquisition unit 101 acquires a face image. For example, the acquisition unit 101 acquires the face image of a user photographed by a camera 17. As another example, in a case where the user's face image is previously stored in a storage device 18, the acquisition unit 101 may acquire the user's face image from the storage device 18.

The display control unit 102 displays the face image acquired by the acquisition unit 101 on the display 16. The user performs an operation of designating positions on the face image displayed on the display 16 using the pointer 20. This operation is an operation of, for example, touching the pointer 20 on the face image in a surface of the display 16. When the user moves the pointer 20 with touching the surface of the display 16, a plurality of positions are designated. The positions on the face image designated by the pointer 20 are detected by the touch sensor 14.

The specifying unit 103 specifies a trajectory by sequentially connecting the positions detected by the touch sensor 14. However, the trajectory may not be specified correctly depending on a shape of the trajectory.

The drawing unit 104 draws a makeup object on the face image along the trajectory specified by the specifying unit 103. This makeup object has, for example, a linear shape centered on the trajectory. A color of the makeup object may be determined to be a color selected by an operation of the user. Further, a thickness of the makeup object may be determined according to a makeup tool selected by an operation of the user. For example, when a thick brush is selected, the thickness of the makeup object may be increased. On the other hand, when a thin brush is selected, the thickness of the makeup object may be decreased. Furthermore, depending on the selected makeup tool, the shape, density, or degree of blurring of an end portion of the makeup object may be changed. In addition, the shape of the end portion includes a stroke shape.

The overlap control unit 105 increases the density of one or more overlapping portions between the makeup object drawn by the drawing unit 104 and another makeup object. This overlapping portion is obtained based on, for example, position coordinates of the makeup object and position coordinates of another makeup object. The overlap control unit 105 may multiply a value indicating the color of the makeup object with a value indicating a color of another makeup object to increase the density of the overlapping portion.

When the trajectory specified by the specifying unit 103 has a point (hereinafter referred to as "change point") where a direction changes with a change amount equal to or greater than a threshold value, the correction unit 106 corrects the density of a first overlapping portion at a position corresponding to the change point. The position corresponding to this change point is, for example, a position within an area defined so as to surround the point. Further, as the change amount of the direction, an angle that indicates a direction of the trajectory and is formed by two vectors contacting at a certain point on the trajectory is used.

Figure 4:
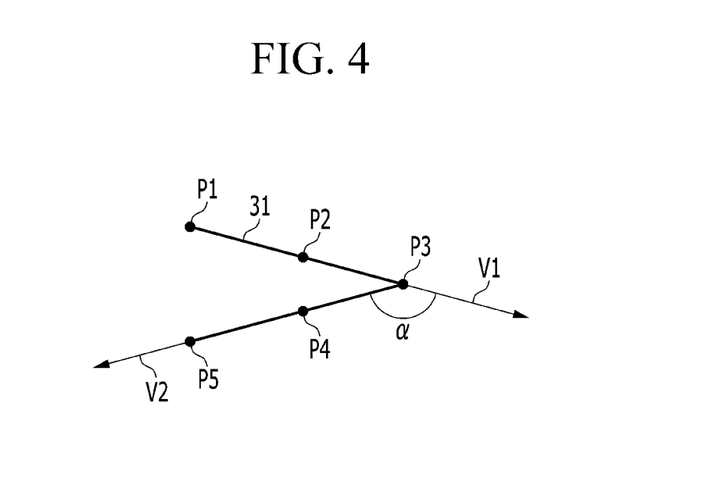
FIG. 4 is a diagram for explaining a method of detecting a change point.

FIG. 4 is a diagram for explaining a method of detecting a change point. First, the correction unit 106 obtains a vector indicating a direction of a trajectory 31 between adjacent points in points P1 to P5 defined at predetermined intervals on the trajectory 31. For example, with respect to the points P2 and P3, a vector V1 indicating the direction of the trajectory 31 between the points P2 and P3 is obtained. With respect to the points P3 and P4, a vector V2 indicating the direction of the trajectory 31 between the points P3 and P4 is obtained.

Subsequently, the correction unit 106 obtains an angle formed by the two contacting vectors at each point of the points P1 to P5. For example, with respect to the vectors V1 and V2, the angle $\alpha$ between the vector V1 and the vector V2 is obtained. Here, it is assumed that this angle $\alpha$ is equal to or greater than the threshold value T1. In this case, the correction unit 106 detects the point P3 where the vector V1 and V2 contact each other as a change point.

Here, in a case where the trajectory has a change point, a phenomenon that the trajectory is not correctly specified occurs. In other words, a minimum value of the change amount of the direction in which such a phenomenon occurs is used as the threshold T1.

Operation

Figure 5:
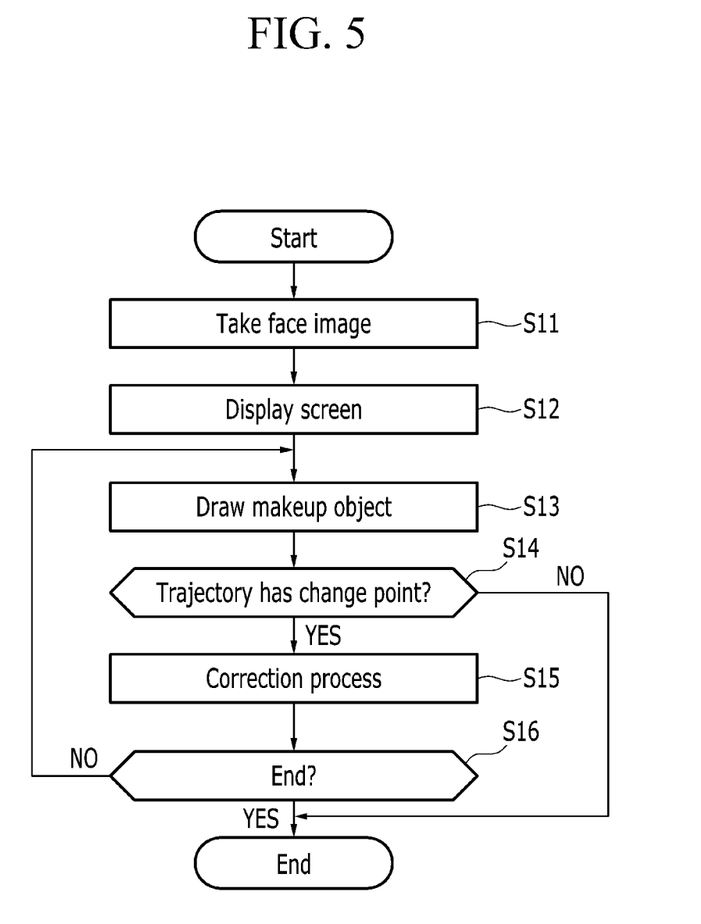
FIG. 5 is a flowchart showing an example of a makeup simulation process.

FIG. 5 is a flowchart showing an example of a makeup simulation process according to a present embodiment. In this process, a makeup simulation using a face image of a user is performed.

In a step S11, the user photographs his or her face image 61 using a camera 17. The acquisition unit 101 acquires the face image 61 photographed by the camera 17.

In step S12, a display control unit 102 displays a screen 161 used for the makeup simulation on a display 16.

Figure 6:
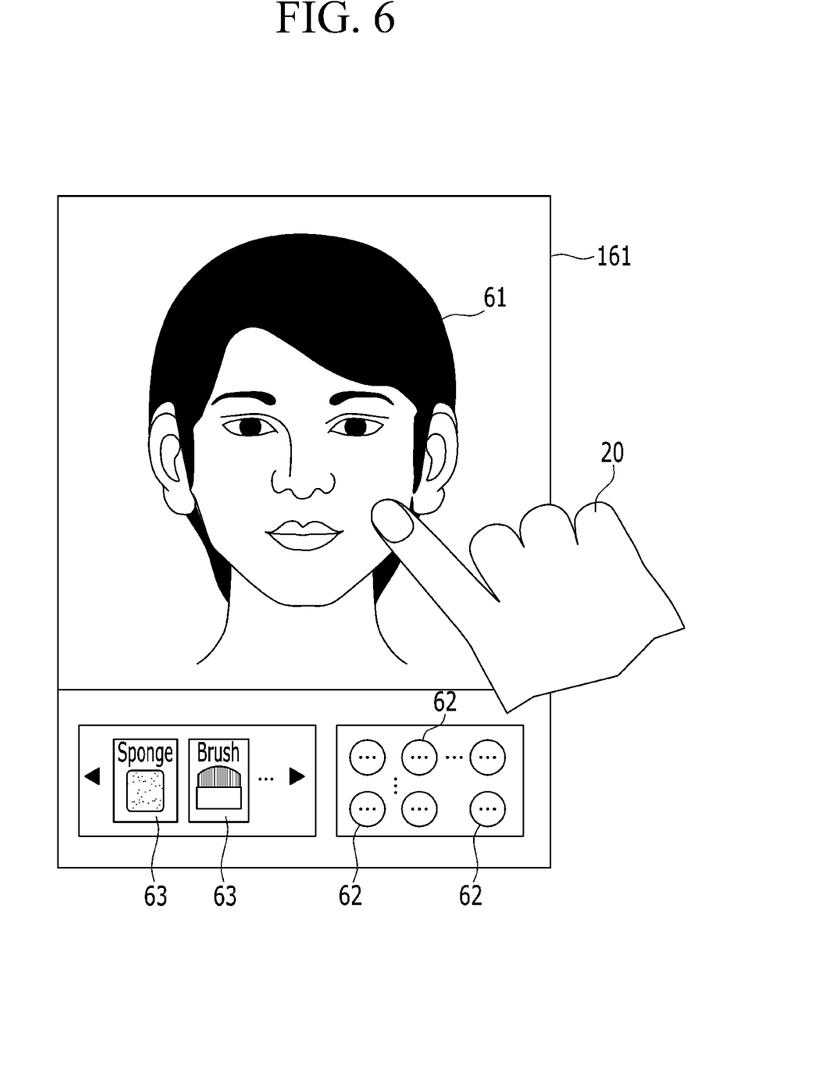
FIG. 6 is a diagram showing an example of a screen 161.

FIG. 6 is a diagram showing an example of a screen 161. The screen 161 includes the face image 61 of the user. Further, the screen 161 includes a plurality of color samples 62 used for selecting makeup colors. These color samples 62 may include not only color samples 62 having different types of colors but also color samples 62 having different color densities or textures. The texture changes depending on, for example, an amount of pearls, an amount of glitter, or transparency. A color of the color sample 62 may be a color of a product being actually sold or may be a color unrelated to the color of the product being actually sold. The user performs an operation of selecting the color sample 62 representing a desired color of makeup from among the plurality of color samples 62 by using the pointer 20. This operation is, for example, a tap operation. Accordingly, the color of makeup is selected.

Further, the screen 161 includes a plurality of icons 63 used for selecting a makeup tool. Each icon 63 includes an image representing the makeup tool. This image may be an image representing a product being actually sold or may be an illustration representing the makeup tool. The user performs an operation of selecting the icon 63 representing a desired makeup tool from among the plurality of icons 63 by using the pointer 20. This operation is, for example, a tap operation. Accordingly, the makeup tool is selected.

Referring to FIG. 5 again, in a step S13, the user performs an operation of applying makeup to the face image 61 by using the pointer 20. A makeup object is drawn on the face image 61 in accordance with this operation. Here, it is assumed that the user performs the operation of painting a color of foundation on a skin region of the face image 61.

Figure 7:
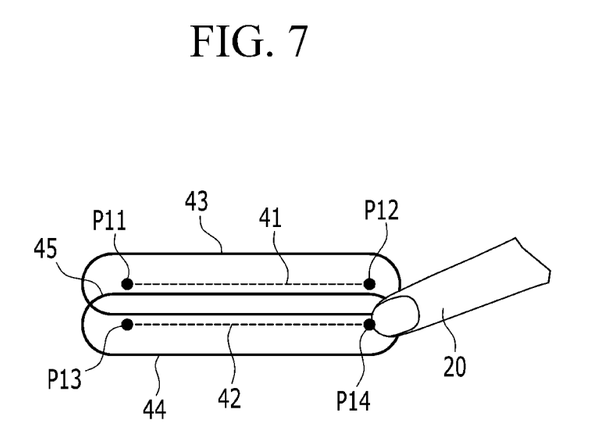
FIG. 7 is a diagram showing an example of a makeup object.

FIG. 7 is a diagram showing an example of a makeup object. In this example, the user brings the pointer 20 in contact with a point P11 within the skin region of the face image 61. Subsequently, the user performs an operation of drawing a trajectory 41 by moving the pointer 20 to a point P12 while touching the surface of the display 16 with the pointer 20. The user releases the pointer 20 once from the surface of the display 16 at the point 12 and then brings the pointer 20 in contact with a point P13. Subsequently, the user performs an operation of drawing a trajectory 42 by moving the pointer 20 to a point P14 while touching the surface of the display 16 with the pointer 20.

The touch sensor 14 detects positions of the pointer 20 touching the surface of the display 16 at a predetermined time interval, and outputs position coordinates indicating the detected positions. The specifying unit 103 specifies the trajectories 41 and 42 by sequentially connecting the positions indicated by the position coordinates that are output from the touch sensor 14.

The drawing unit 104 draws makeup objects 43 and 44 on the face image 61 along the trajectories 41 and 42 specified by the specifying unit. The makeup object 43 and the makeup object 44 have an overlapping portion 45. The overlap control unit 105 increases a density of the overlapping portion 45. Accordingly, the density of the overlapping portion 45 becomes higher than densities of other portions of the makeup object 43 or 44.

Figure 8:
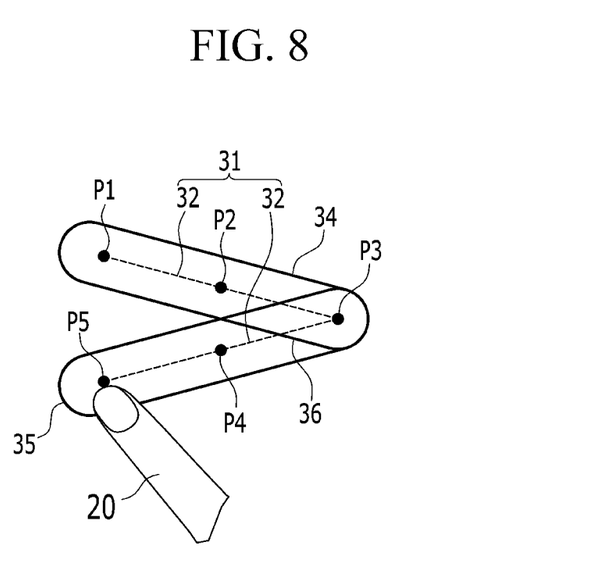
FIG. 8 is a diagram showing another example of a makeup object.

FIG. 8 is a diagram showing another example of a makeup object. In this example, the user brings a pointer 20 in contact with a point P1 on a skin region of the face image 61. Subsequently, the user performs an operation of drawing a trajectory 31 shown in FIG. 4 by moving the pointer 20 to points P1 to P5 while touching a display 16 with the pointer 20.

The touch sensor 14 detects the positions of the pointer 20 that has touched the surface of the display 16 at a predetermined time interval, and outputs the position coordinates indicating the detected positions. As described above, a trajectory 31 changes its direction at a point P3 with a change amount that is equal to or greater than a threshold value T1. In this case, the trajectory 31 is not correctly specified. In this example, the specifying unit 103 sequentially connects the positions indicated by the position coordinates output from the touch sensor 14, thereby specifying two separate trajectories 32 and 33 instead of one trajectory 31. The trajectories 32 and 33 are trajectories into which the trajectory 31 is divided at the point P3.

The drawing unit 104 draws makeup objects 34 and 35 on the face image 61 along the trajectories 32 and 33 specified by the specifying unit 103, respectively. The makeup object 34 and the makeup object 35 have an overlapping portion 36 (an example of a first overlapping portion). The overlap control unit 105 increases the density of the overlapping portion 36. Accordingly, the density of the overlapping portion 36 becomes higher than the densities of the other portions of the makeup object 34 or the makeup object 35.

Referring to FIG. 5 again, in a step S14, the correction unit 106 determines whether or not the trajectory of the positions of the pointer 20 has a change point. In the example shown in FIG. 7, since the directions of the trajectories 41 and 42 do not change, the change amount of the direction in any of the trajectories 41 and 42 is less than the threshold value T1. In this case, it is determined that neither of the trajectory 41 nor the trajectory 42 has the change point. In this way, when the determination in the step S14 is "no," a flow proceeds to a step S16 without performing processing in a step S15.

On the other hand, in the example shown in FIG. 8, the trajectories 32 and 33 are connected at the point P3, and the change amounts of the direction in the trajectory 32 and the direction of the trajectory 33 are equal to or greater than the threshold value T1. In this case, since this point P3 is a change point, it is determined that the trajectories 32 and 33 have change points. As described above, if the determination in the step S14 is "yes," the flow proceeds to the step S15.

In the step S15, the correction unit 106 performs a correction process of correcting the density of the overlapping portion at the position corresponding to the change point. In the example shown in FIG. 8, the density of the overlapping portion 36 at the position corresponding to the point P3 is corrected. For example, it is assumed that the density of the portion excluding the overlapping portion 36 in the makeup object 34 or 35 is D1 and the density of the overlapping portion 36 is D2. In this case, the density D2 of the overlapping portion 36 is decreased to the density D1. As a result, the density difference between the overlapping portion 36 and the other portion is eliminated.

As shown in FIG. 8, when the user performs the operation of drawing the trajectory 31 while touching the surface of the display 16 with the pointer 20, it is considered that there is no intention to overlay the color in the overlapping portion 36 of the makeup objects 34 and 35 corresponding to the trajectory 31. Therefore, the correction process of the density is performed on the overlapping portion 36.

On the other hand, as in the example shown in FIG. 7, when the user releases the pointer 20 once from the surface of the display 16 to perform the operation of drawing the two trajectories 41 and 42, it is considered that there is an intention to overlay the color in the overlapping portion 45 of the makeup objects 43 and 44 corresponding to the trajectories 41 and 42. Therefore, the correction process of the density is not performed on the overlapping portion 45.

Referring to FIG. 5 again, in the step S16, it is determined whether or not an operation of ending the simulation process is performed. This operation is performed by using, for example, the pointer 20 or an operation button 15. When the operation of ending the simulation process is not performed, the flow returns to the above-described the step S13. By repeating the processing of the steps S13 to S16 in this way, various kinds of makeup such as foundation, eye shadow, cheek, lipstick and the like are applied to the face image 61. Each time the makeup is performed by the user's operation, the face image 61 after the makeup is displayed on the display 16. On the other hand, when the operation of ending the simulation process is performed, the flow ends.

According to the present embodiment, the density of the overlapping portion whose density has been increased differently from the user's intention is corrected. Thus, it is possible to simulate the makeup according to the user's intention.

MODIFIED EXAMPLES

The present invention is not limited to the above-described embodiment. The embodiment may be modified as follows. In addition, the following modified examples may be combined.

Modified Example 1

In the above-described embodiment, the density of the makeup object may change according to a predetermined parameter. The predetermined parameter includes, for example, a length of a trajectory. In this case, a drawing unit 104 may decrease the density of the makeup object as the trajectory becomes longer.

In another example, the predetermined parameter may include a pressure. In this case, a user terminal 10 includes a pressure sensor for measuring the pressure applied to a surface of a display 16. The drawing unit 104 may increase the density of the makeup object as the pressure measured by the pressure sensor becomes larger.

In yet another example, the predetermined parameter may include a moving speed of a pointer 20. In this case, the user terminal 10 or the pointer 20 includes a speed sensor for measuring the moving speed of the pointer 20. The drawing unit 104 may decrease the density of the makeup object as the moving speed measured by the speed sensor becomes higher.

Further, as in these modified examples, in a case where the density changes in the makeup object, if the density of the overlapping portion is simply decreased to the density of a certain portion other than the overlapping portion in the makeup object, the density difference may generate between the overlapping portion and an area adjacent to the overlapping portion such that unnaturalness can occur. In order to prevent this case, the correction unit 106 may perform a correction process as follows.

Figure 9:
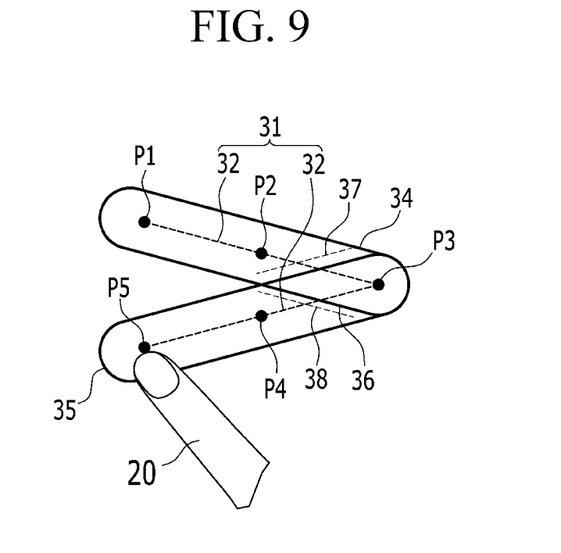
FIG. 9 is a diagram for explaining an example of a correction process according to a modified example.

FIG. 9 is a diagram for explaining an example of a correction process according to this modified example. In this example, the correction unit 106 extracts a density D3 (an example of a first density) and a density D4 (an example of a second density) from reference areas 37 and 38 adjacent to an overlapping portion 36, respectively. When the reference area 37 or 38 has a plurality of densities, the plurality of densities may be extracted. The correction unit 106 corrects the density of the overlapping portion 36 so as to gradually change from the density D3 to the density D4. Thus, the density difference between the overlapping portion 36 and the reference areas 37 and 38 can be reduced.

Modified Example 2

In the above-described embodiment, when a predetermined condition is satisfied, the correction process may not be performed or the degree of the correction process may be lowered. For example, when the thickness of the makeup object is equal to or less than a threshold value T2, the correction process may not be performed. On the other hand, when the thickness of the makeup object is greater than the threshold value T2, the correction process is performed in the same manner as in the above-described embodiment. This is because the density difference between the overlapping portion and the other portion is conspicuous when the thickness of the makeup object is large, whereas it is difficult to recognize the density difference between the overlapping portion and the other portion when the thickness of the makeup object is small.

Modified Example 3

In the above-described embodiment, it is considered that there is no intention to overlay the color on an area close to the change point but there is an intention to overly the color on an area far from the change point in a case where the overlapping portion at the position corresponding to the change point is large. Therefore, in this case, for example, the correction process may be performed for an area within a predetermined range including the change point in the overlapping portion, but the correction process may be not performed or the degree of the correction process may be lowered for other areas.

Figure 10:
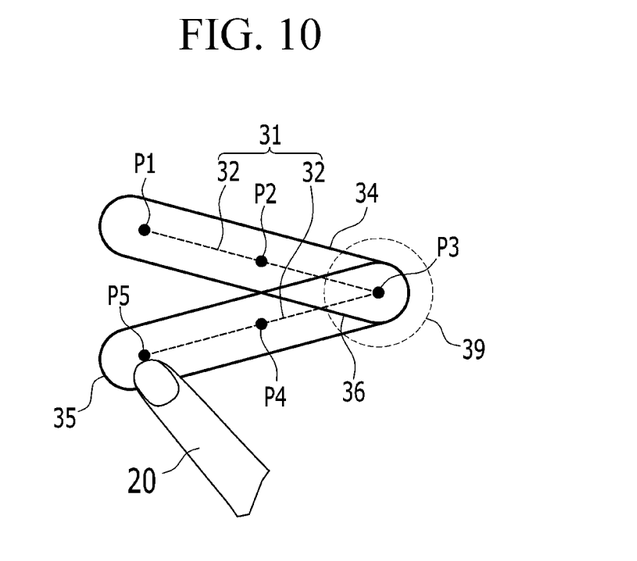
FIG. 10 is a diagram showing yet another example of a correction process according to a modified example.

FIG. 10 is a diagram for explaining an example of a correction process according to this modified example. The correction unit 106 corrects a density for an area 39 within a predetermined range including a point P3 in an overlapping portion 36 in the same manner as in the above-described embodiment. On the other hand, the correction unit 106 does not correct a density for areas other than the area 39 in the overlapping portion 36.

Modified Example 4

In the above-described embodiment, when a predetermined condition is satisfied, the density of the overlapping portion may be corrected regardless of whether or not the trajectory has the change point. The overlapping portion may include not only an overlapping portion at a position corresponding to the change point but also other overlapping portion.

For example, when the overlapping portion is located on a predetermined area such as an outline of the face image 61, the correction unit 106 may correct the density of all overlapping portions which a makeup object corresponding to this trajectory has. The predetermined area is, for example, an area where it is difficult to accurately designate a position by using the pointer 20. In a case of performing an operation of applying makeup to such an area, there is a case where the makeup objects overlap because the pointer 20 touches an unintended position. However, in this case, it is considered that there is no intention of overlaying the color on the overlapping portion. Therefore, the density may be corrected for the overlapping portion located in the predetermined area.

In another example, when the number of times or a frequency when the pointer 20 passes a predetermined area is equal to or larger than a threshold value T3 or a time interval at which the pointer 20 passes the predetermined area is equal to or less than a threshold value T4, the correction unit 106 may correct the density of all the overlapping portions which a makeup object corresponding to the trajectory has. This is because it is considered that there is no intention of overlaying the color on the overlapping portion even when such a condition is satisfied.

Modified Example 5

In the above-described embodiment described above, a person different from the user may perform an operation of applying a makeup to the face image of the user by using a terminal different from the user terminal 10. The person different from the user is, for example, an instructor such as a professional makeup artist. In this case, the user can learn makeup that suits himself or herself or how to perform the makeup by watching the makeup performed by the instructor.

Figure 11:
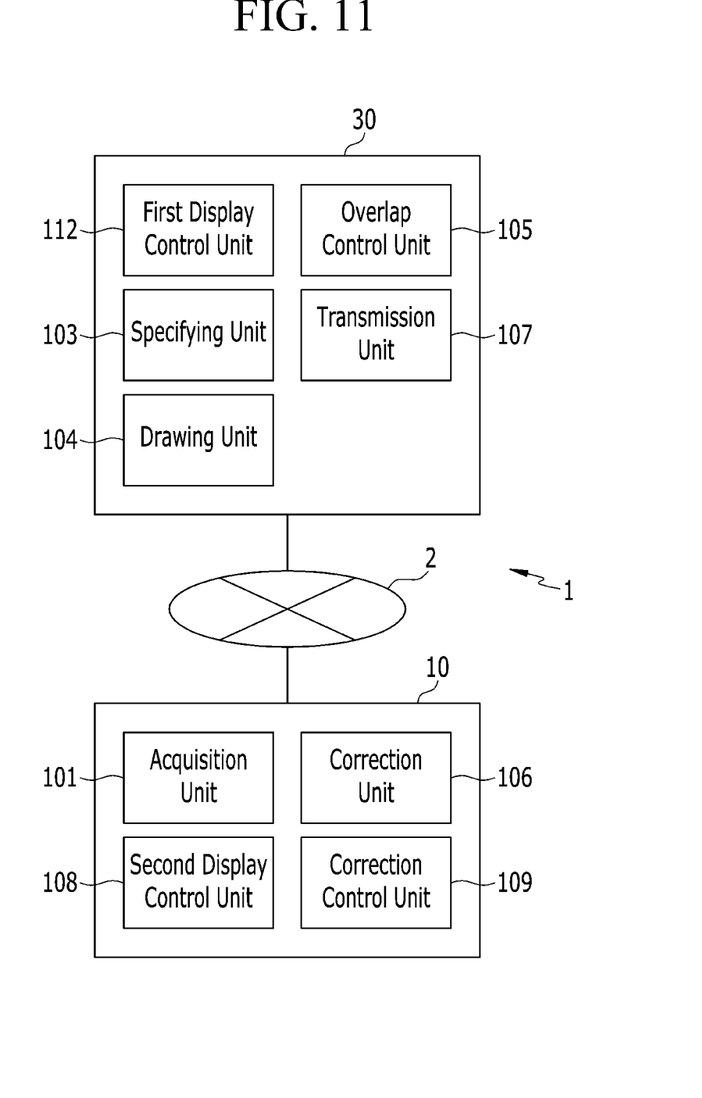
FIG. 11 is a diagram showing an example of an image processing system 1 according to a modified example.

FIG. 11 is a diagram showing an example of an image processing system 1 according to this modified example. The image processing system 1 includes a user terminal 10 (an example of a second terminal) and another terminal 30 (an example of a first terminal). The user terminal 10 and the terminal 30 are connected via a network 2 (an example of a communication line) such as the Internet. Like the user terminal 10, the terminal 30 is a computer such as a tablet terminal, a mobile terminal, a personal computer, or the like.

The terminal 30 is used by the instructor. The terminal 30 has the same hardware configuration as the user terminal 10.

The terminal 30 functions as a first display control unit 112 and a transmission unit 107 in addition to a specifying unit 103, a drawing unit 104, and an overlap control unit 105 described in the embodiment. These functions are realized by executing a program stored in a memory by one or more processors. Further, the transmission unit 107 is realized by a communication interface under a control of the processor. The first display control unit 112 has the same function as a display control unit 102 described in the embodiment. The transmission unit 107 transmits screen data indicating a screen displayed on the display (an example of a display unit) of the terminal 30 to the user terminal 10.

The user terminal 10 functions as a second display control unit 108 and a correction control unit 109 in addition to an acquisition unit 101 and a correction unit 106 described in the embodiment. These functions are realized by executing a program stored in a memory 12 by one or more processors 11. The second display control unit 108 displays a screen corresponding to the screen data received from the terminal 30 on a display 16 (an example of a second display unit). As a result, screen sharing is performed between the terminal 30 and the user terminal 10. The correction control unit 109 controls execution of the correction process by the correction unit 106 according to a screen size of the display 16.

Next, an operation of the image processing system 1 according to this modified example is described. The user terminal 10 transmits image data indicating the face image 61 of the user to the terminal 30 through the communication interface 13. The terminal 30 displays the face image 61 indicated by the image data received from the user terminal 10 on the display by a first display control unit 112. The instructor performs an operation of applying makeup to the face image 61 by using a pointer. In accordance with this operation, a makeup object is drawn on the face image 61 as in the embodiment. The terminal 30 transmits screen data indicating a screen of the display to the user terminal 10 at a predetermined time interval by the transmission unit 107. At this time, position coordinates indicating a position of an overlapping portion at a position corresponding to a change point may be transmitted together with the screen data.

The user terminal 10 receives the screen data from the terminal 30 through the communication interface 13. Subsequently, the user terminal 10 displays a screen corresponding to the screen data on the display 16 by the second display control unit 108. Further, when the screen includes the makeup object having the overlapping portion at the position corresponding to the change point, the user terminal 10 may perform a correction process for correcting the density of the overlapping portion by the correction unit 106 before displaying the screen. This overlapping portion is specified by the position coordinates received from the terminal 30.

Furthermore, the user terminal 10 may control the execution of the correction process by the correction control unit 109 according to the screen size of the display 16. For example, when the screen size of the display 16 is larger than a threshold value T5, the execution of the correction process may be permitted. On the other hand, when the screen size of the display 16 is equal to or less than the threshold value T5, the execution of the correction process may be prohibited or the degree of the correction process may be lowered. This is because the density difference between the overlapping portion and the other portion is inconspicuous when the display 16 has a small screen. Thus, the processing amount of the image processing system 1 can be reduced.

According to the present modified example, the face image 61 to which the instructor applies the makeup is displayed on the display 16 of the user terminal 10 in real time. As a result, the user can view a state where the makeup is applied to his or her face image 61 by the instructor.

In another example, voice data indicating a voice of the instructor may be transmitted from the terminal 30 to the user terminal 10 together with the screen data. In this case, the terminal 30 includes a microphone that collects a voice and converts the voice into voice data. Further, the user terminal 10 includes a speaker that outputs a voice corresponding to the voice data. As a result, the voice of the instructor is output from the speaker of the user terminal 10 in real time.

While the user terminal 10 has the correction unit 106 in the example shown in FIG. 11, the terminal 30 may have the correction unit 106 instead of the user terminal 10. In this case, the correction process is performed on the terminal 30. Then, screen data indicating a screen including the makeup object after the correction are transmitted from the terminal 30 to the user terminal 10.

Modified Example 6

While the position on the face image is designated by the pointer 20 touching the surface of the display 16 in the above-described embodiment, the method of designating the position on the face image is not limited to this method. For example, in a case where the user terminal 10 has a sensor for detecting the pointer 20 located within a predetermined detection range formed along a normal direction from the surface of the display 16, the position on the face image may be designated by the pointer 20 coming close to the surface of the display 16.

Modified Example 7

The shape of the trajectory or the position of the change point is not limited to the examples described in the embodiment. For example, the trajectory may be a curve. In this case, a curvature may be used as the change amount in the direction of the trajectory. In this case, a point having a curvature greater than or equal to a threshold value in the trajectory may be the change point.

Modified Example 8

The steps of processing performed in the user terminal 10 or the image processing system 1 are not limited to the examples described in the above embodiment. The steps of this processing may be interchanged if there is no contradiction. Further, the present invention may be provided as a method including the steps of processing performed in the user terminal 10 or the image processing system 1.

Modified Example 9

The present invention may be provided as a program executed on the user terminal 10 or the terminal 30. This program may be downloaded via a network such as the Internet.

In addition, the program may be provided in a state recorded in a computer-readable recording medium such as a magnetic recording medium (a magnetic tape, a magnetic disk, etc.), an optical recording medium (an optical disk, etc.), or a magneto-optical recording medium.

What is claimed is:

1. An information processing system comprising:
a display; and
one or more processors that:
acquire a face image;
display the acquired face image on the display;
detect at least one position on the face image designated by a pointer;
draw a makeup object on the face image along a trajectory specified by sequentially connecting the detected at least one position;
increase a density of one or more overlapping portions between the makeup object and another makeup object; and
when the trajectory has a point where a direction changes with a change amount equal to or greater than a threshold value, correct a density of a first overlapping portion at a position corresponding to the point, the first overlapping portion being included in the one or more overlapping portions.

2. The image processing system according to claim 1, wherein the makeup object is a linear object having a predetermined thickness.

3. The image processing system according to claim 1, wherein the one or more processors decrease the density of the first overlapping portion to a density of a portion other than the one or more overlapping portions in the makeup object.

4. The image processing system according to claim 1, wherein the one or more processors change a density of the makeup object according to a predetermined parameter, and
wherein the one or more processors extract a first density and a second density from two areas, respectively, the two areas being adjacent to each other with the first overlapping portion therebetween in the makeup object or said another makeup object, and correct the density of the first overlapping portion so as to gradually change from the first density to the second density.

5. The image processing system according to claim 4, wherein the predetermined parameter includes a length of the trajectory, and
wherein the one or more processors change the density of the makeup object according to the length of the trajectory.

6. The image processing system according to claim 1, wherein the one or more processors, when a predetermined condition is satisfied, correct a second overlapping portion that is different from the first overlapping portion and is included in the one or more overlapping portions, regardless of whether or not the trajectory has the point.

7. The image processing system according to claim 6, wherein the predetermined condition is a condition that the second overlapping portion is located in a predetermined area of the face image or a condition corresponding to a number of times, a frequency, or a time interval when the trajectory passes the predetermined area.

8. The image processing system according to claim 1, wherein the one or more processors control execution of correction according to a screen size of the display.

9. An information processing apparatus comprising:
a display; and
one or more processors that:
acquire a face image;
display the acquired face image on the display;
detect at least one position on the face image designated by a pointer;
draw a makeup object on the face image along a trajectory specified by sequentially connecting the detected at least one position;
increase a density of one or more overlapping portions between the makeup object and another makeup object; and
when the trajectory has a point where a direction changes with a change amount equal to or greater than a threshold value, correct a density of a first overlapping portion at a position corresponding to the point, the first overlapping portion being included in the one or more overlapping portions.

10. An image processing method comprising:
acquiring a face image;
displaying the acquired face image on a display unit;
detecting at least one position on the face image designated by a pointer;
drawing a makeup object on the face image along a trajectory specified by sequentially connecting the detected at least one position;
increasing a density of one or more overlapping portions between the makeup object and another makeup object; and
correcting, when the trajectory has a point where a direction changes with a change amount equal to or greater than a threshold value, a density of a first overlapping portion at a position corresponding to the point, the first overlapping portion being included in the one or more overlapping portions.

* * * * *